(12) United States Patent
Schaenzel et al.

(10) Patent No.: US 10,864,938 B2
(45) Date of Patent: Dec. 15, 2020

(54) METHOD FOR MONITORING THE STATUS OF AN ELECTRONIC POWER STEERING DEVICE OF AT LEAST ONE COMPONENT OF THE ELECTRONIC POWER STEERING DEVICE OF A MOTOR VEHICLE

(71) Applicant: Robert Bosch Automotive Steering GmbH, Schwäbisch Gmünd (DE)

(72) Inventors: Rainer Schaenzel, Essingen (DE); Gerd Speidel, Winterbach (DE); Thomas Alber, Filderstadt (DE); Michael Sturm, Staufen (DE)

(73) Assignees: Robert Bosch GmbH, Stuttgart (DE); Robert Bosch Automotive Steering GmbH, Schwäbisch Gmünd (DE)

( * ) Notice: Subject to any disclaimer, the term of this patent is extended or adjusted under 35 U.S.C. 154(b) by 261 days.

(21) Appl. No.: 16/062,080

(22) PCT Filed: Dec. 2, 2016

(86) PCT No.: PCT/EP2016/079550
§ 371 (c)(1),
(2) Date: Jun. 13, 2018

(87) PCT Pub. No.: WO2017/102375
PCT Pub. Date: Jun. 22, 2017

(65) Prior Publication Data
US 2018/0370563 A1    Dec. 27, 2018

(30) Foreign Application Priority Data
Dec. 18, 2015   (DE) .................. 10 2015 122 253

(51) Int. Cl.
*B62D 5/04*    (2006.01)
*F16H 57/01*   (2012.01)
*B62D 3/12*    (2006.01)

(52) U.S. Cl.
CPC ......... *B62D 5/0484* (2013.01); *B62D 5/0481* (2013.01); *F16H 57/01* (2013.01); *B62D 3/12* (2013.01); *F16H 2057/012* (2013.01)

(58) Field of Classification Search
CPC ...... B62D 5/0484; B62D 5/0481; B62D 3/12; F16H 57/01; F16H 2057/012
See application file for complete search history.

(56) References Cited

U.S. PATENT DOCUMENTS

2014/0074345 A1    3/2014   Gabay et al.

FOREIGN PATENT DOCUMENTS

| DE | 101 44 076 A1 | 3/2003 |
| DE | 10 2006 059 945 A1 | 6/2008 |
| DE | 10 2013 220 519 A1 | 4/2014 |

OTHER PUBLICATIONS

International Search Report corresponding to PCT Application No. PCT/EP2016/079550, dated Feb. 13, 2017 (German and English language document) (5 pages).

*Primary Examiner* — Michael D Lang
(74) *Attorney, Agent, or Firm* — Maginot, Moore & Beck LLP

(57) ABSTRACT

A method for monitoring the condition of an electronic power steering apparatus or of at least one part of the electronic power steering apparatus of a motor vehicle includes continually capturing acceleration measured values in a region of the electronic power steering apparatus during a driving mode of the motor vehicle and continually providing the captured acceleration measured values to a damage computation section in the form of a damage meter that continuously sums the acceleration measured values and continually forms therefrom at least one variable characterizing a degree of damage to the electronic power steering apparatus or to the at least one part of the electronic power (Continued)

steering apparatus. The method further includes continually comparing the variable with at least one prescribed limit value.

20 Claims, 1 Drawing Sheet

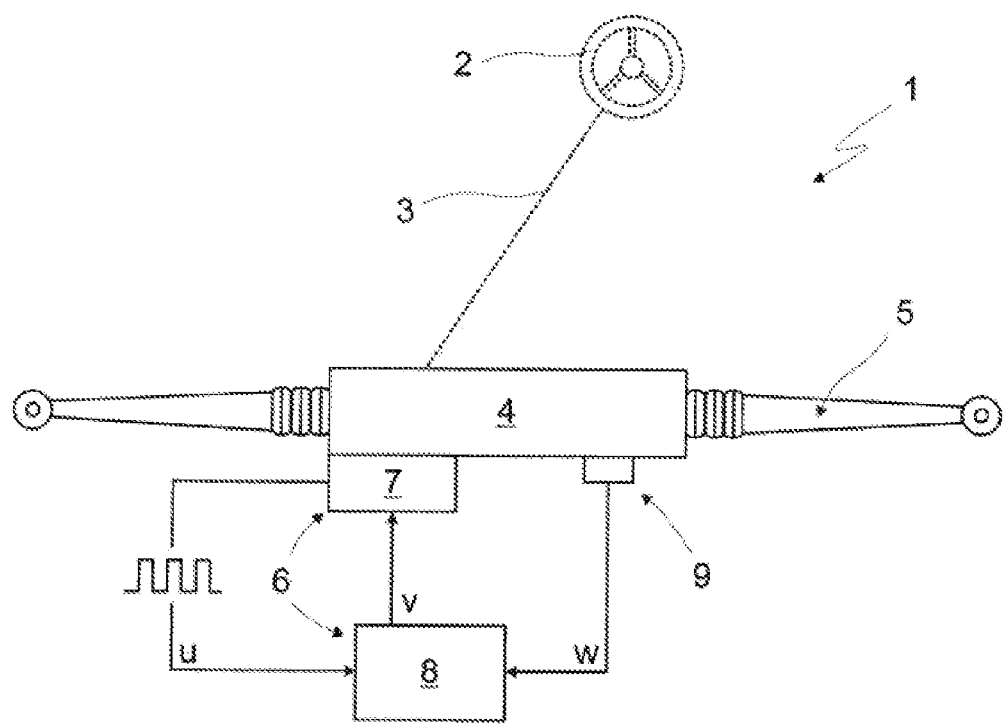

METHOD FOR MONITORING THE STATUS OF AN ELECTRONIC POWER STEERING DEVICE OF AT LEAST ONE COMPONENT OF THE ELECTRONIC POWER STEERING DEVICE OF A MOTOR VEHICLE

This application is a 35 U.S.C. § 371 National Stage Application of PCT/EP2016/079550, filed on Dec. 2, 2016, which claims the benefit of priority to Serial No. DE 10 2015 122 253.1, filed on Dec. 18, 2015 in Germany, the disclosures of which are incorporated herein by reference in their entirety.

BACKGROUND

The disclosure relates to a method for monitoring the condition of an electronic power steering apparatus or of at least one part of the electronic power steering apparatus of a motor vehicle. The disclosure likewise relates to an electronic power steering apparatus of a motor vehicle, to a motor vehicle having an electronic power steering apparatus and to a computer program.

Electric steering systems or electronic power steering apparatuses will increasingly be used in future for the "autonomous driving" or "steer by wire" applications. A typical feature of such operating conditions is that failure of the steering or parts thereof needs to be avoided, since otherwise serious accidents can be expected. No methods have existed to date to monitor the condition of all of the, in particular rapidly rotating, steering components (e.g. bearings, electric motor, toothed belts, etc.).

SUMMARY

The disclosure is based on the object of detecting imminent failure of an electronic power steering apparatus or of at least one part of the electronic power steering apparatus reliably, in particular increasing safety during the operation of a motor vehicle having an electronic power steering apparatus.

This object is achieved, according to the disclosure, by a method for monitoring the condition of an electronic power steering apparatus or of at least one part of the electronic power steering apparatus of a motor vehicle, wherein during the driving mode of the motor vehicle acceleration measured values are continually captured in a region of the electronic power steering apparatus, wherein:
a) the captured acceleration measured values are continually, or continuously, supplied to a damage computation section that sums the acceleration measured values, in particular in modified form, and continually, or continuously, forms therefrom at least one variable characterizing a degree of damage to the electronic power steering apparatus or to the at least one part of the power steering apparatus; and/or wherein
b) at least one variable characterizing a current steering condition of the electronic power steering apparatus or of the at least one part of the electronic power steering apparatus is continually, or continuously, formed from the captured acceleration measured values.

These measures provide a method that can be used to monitor the condition of all of the, rapidly rotating, steering components. Measurement of accelerations or vibrations (structure-borne sound) that occur at steering system level allows early detection with appropriate warning to be output to the driver using a sufficient warning period as soon as imminent failure of the steering can be expected.

Therefore, it is firstly possible for the ascertained acceleration values to be supplied to a continuously summing damage computation section. When a defined degree of damage or degree of vibration damage is reached, the steering system can deliver a warning or be subsequently shut down. Further, the use of the measurement data for a degree of vibration damage allows statistical certainties or reliabilities to be increased without generating an overdimensioned design (overdesign) using unrealistic worst-case assumptions. In particular, such a meter for rating and grading units capable of conditioning is a significant help and minimization of risk. In other words, the actual current condition of the steering is measured. The captured acceleration measurement signals or acceleration measured values are summed such that a variable characterizing the degree of damage to the electronic power steering apparatus or to the at least one part of the electronic power steering apparatus can be formed. The acceleration measurement signals are supposed to be used for summation with a damage meter. If the latter has reached a limit value, it is possible for a warning or the like to be output, for example, since a swift failure of the steering can be expected. In the present case, summation in modified form or suitable summation can mean e.g. that the acceleration measured values can naturally be converted, multiplied by factors, appropriately weighted or otherwise used in the summation. The damage computation can be effected in a damage model.

Alternatively or additionally, the steering can be monitored constantly by a condition monitoring section by means of acceleration measurement signals, or an acceleration sensor or structure-borne sound sensor, in order to anticipate failure of the components early and hence to output the possibility of an appropriate warning/fault report e.g. to the driver or as an entry in a fault memory of the vehicle. By way of example, a steering component that was not optimum from the outset can fail before the limit value of the damage meter is reached. This case can be avoided by continuous monitoring of this kind, in particular of frequency spectra or order spectra. It would also be possible for the electronic power steering apparatus or one of the parts thereof to be so severely damaged as a result of misuse of the steering that it cannot continue to be used. This could likewise be detected by monitoring of the currently applied acceleration measured values.

The at least one variable characterizing the current steering condition of the electronic power steering apparatus or of the at least one part of the electronic power steering apparatus can be formed by analysis of the captured acceleration measured values in regard to frequencies or orders that occur. For an analysis of the frequencies that occur, it is possible e.g. to use a Fast Fourier Transformation (FFT). Moreover, the order response can be analyzed. From the rotation speed (e.g. of the electric motor) and the frequency, it is possible to determine the order of the acceleration measured values. In this case, it holds that: order=frequency/rotation speed.

The frequencies or orders that occur can be assigned to the at least one part causing them, in particular to an electric motor, a toothed belt or a bearing of the electronic power steering apparatus. It is accordingly checked whether captured acceleration measured values or a conspicuous sound or a damage signal can be assigned to a component or a part of the electronic power steering apparatus. By way of example, the toothed belt may be assigned to the $41^{st}$ order.

The at least one variable characterizing the degree of damage to the electronic power steering apparatus or to the at least one part of the electronic power steering apparatus and/or the at least one variable characterizing the current steering condition of the electronic power steering apparatus or of the at least one part of the electronic power steering apparatus can be continually compared with at least one prescribed limit value. Analysis of the time data obtained is used to ascertain suitable variables for describing the steering condition (e.g. by a Fast Fourier Transformation or using an order response) and to align them with defined limit values. Alternatively or additionally, it is checked whether the degree of damage has reached a defined extent of vibration damage.

In the event of the at least one prescribed limit value being exceeded by the at least one variable characterizing the degree of damage to the electronic power steering apparatus or to the at least one part of the electronic power steering apparatus and/or by the at least one variable characterizing the current steering condition of the electronic power steering apparatus or of the at least one part of the electronic power steering apparatus, one or more of the following measures can be initiated:

a) output of a warning to the driver of the motor vehicle;
b) changeover to an emergency operating condition of the electronic power steering apparatus or of the motor vehicle;
c) deactivation of a mode of operation of the electronic power steering apparatus or of the motor vehicle, in particular of autonomous driving, in particular when the vehicle is next started; and
d) storage of a fault report in a memory element of an electronic closed- and/or open-loop controller of the electronic power steering apparatus or of the motor vehicle, wherein the fault report comprises a current date, a current time and/or a current speed of travel of the motor vehicle. The aforementioned measures can be used to define appropriate fault strategies. This approach allows early warning of wear. It is conceivable for the fault report to additionally result in, by way of example, a manual torque, measured track rod forces, an overload or measured motor currents being stored, in order to allow the most exact possible determination of the fault that has occurred.

The acceleration measured values can be captured in particular as measurement signals by means of at least one acceleration sensor or structure-borne sound sensor arranged in the region of the electronic power steering apparatus, in particular on a circuit board of an electronic closed- and/or open loop controller of the electronic power steering apparatus. An acceleration sensor or miniature acceleration sensor or structure-borne sound sensor can be arranged in the region of the electronic power steering apparatus. The sensor delivers the operating response for the condition monitoring and the data for the damaged computation. The disclosure specifies an electronic power steering apparatus of a motor vehicle.

The at least one acceleration sensor may be of piezoelectric, microelectromechanical or capacitive design. Such an acceleration sensor or acceleration pickup or structure-borne sound sensor can be integrated in particular into the steering gear of the electronic power steering apparatus during mass production. The at least one acceleration sensor may be designed e.g. as a microsystem or MEMS (Micro Electro Mechanical System). Other types of acceleration sensors or structure-borne sound sensors are also possible.

The at least one acceleration sensor or structure-borne sound sensor can have, in particular as a miniature acceleration sensor, a weight of <1 g and/or a pickup range from 20 Hz to 6,000 Hz and/or a measurement range from +/−0.0187 $m/s^2$ to +/−5,000 $m/s^2$. Furthermore, the acceleration sensor may be configured one-dimensionally and/or have a linearity up to 11 kHz. The weight of such an acceleration sensor may be 0.28 g, for example.

It is advantageous if the at least one acceleration sensor or structure-borne sound sensor is arranged in the region of the steering gear, in particular on a housing of the steering gear or of a ball screw drive of the steering gear, on the electric servo drive, in particular on the electric motor or on an electronic closed- and/or open-loop controller. The installed position of the at least one acceleration sensor or structure-borne sound sensor may be e.g. in the region of the housing of a ball screw drive for the electronic power steering apparatus or in the electric motor or on a coupling point or on the electronic closed- and/or open-loop controller, or on the ECU (Electronic Control Unit), depending on the specific requirements. The closer the acceleration sensor is arranged to the steering components, the more accurate the detection of the acceleration measured values or acceleration measurement signals and the assignment to the respective causing component. It is particularly advantageous if the acceleration sensor or the structure-borne sound sensor is arranged in the region of the electronic closed- and/or open-loop controller or preferably directly on the closed- and/or open-loop controller (ECU) or on the circuit board/ printed circuit board thereof, since this allows the wiring to be advantageously kept down.

The disclosure specifies a motor vehicle having an electronic power steering apparatus, an electronic closed- and/or open-loop controller and at least one acceleration sensor or structure-borne sound sensor that is present in the region of the electronic power steering apparatus, wherein the electronic closed- and/or open-loop controller is provided with acceleration measured values from the at least one acceleration sensor or from the at least one structure-borne sound sensor as input signals and, in particular, is set up to perform the method according to the disclosure. The electronic closed- and/or open-loop controller, or the ECU, may to this end be electrically connected and/or communicatively connected to the acceleration sensor or the structure-borne sound sensor.

The method according to the disclosure for capturing one or more conspicuous sounds during the operation of a motor vehicle is preferably realized as a computer program on one or in a manner distributed over multiple closed- and/or open-loop controller(s) of the motor vehicle or of the electronic power steering apparatus, other solutions naturally also being possible. To this end, the computer program may be stored in a memory element of the at least one closed- and/or open-loop controller. Execution on a microprocessor of the controller allows the method to be carried out. The computer program may be stored on a computer-readable data storage medium (floppy disk, CD, DVD, hard disk, USB memory stick, SD card or the like) or on an internet server as a computer program product and can be transmitted therefrom to the memory element of the closed- and/or open-loop controller. Such a computer program is disclosed herein.

Advantageous configurations and developments of the disclosure emerge from the disclosure. The principles of an exemplary embodiment of the disclosure are specified below with reference to the drawing.

BRIEF DESCRIPTION OF THE DRAWING

The single FIGURE of the drawing shows a simplified schematic depiction of an electronic power steering apparatus according to the disclosure.

DETAILED DESCRIPTION

The FIGURE shows an electronic power steering apparatus of a motor vehicle, not depicted. The electronic power steering apparatus 1 has a steering handle, indicated in dashes, configured as a steering wheel 2. The steering wheel 2 is connected to a steering gear 4 via a drive shaft or steering column 3 (likewise indicated in dashes). The steering gear 4 is used to convert a rotary angle of the steering column 3 into a wheel steering angle of steerable wheels, not depicted, of the motor vehicle.

The steering gear 4 has a toothed rack 5, depicted in simplified fashion, and a pinion, not depicted, on which the steering column 3 engages. The steering wheel 2 prescribes a steering wheel angle as a measure of a desired wheel steering angle of the steerable wheels of the motor vehicle. The input angle of the steering gear 4 is the pinion angle in the present exemplary embodiment. Furthermore, the electronic power steering apparatus 1 has an electric serve drive 6 that is used for variable torque assistance, inter alia. The electric servo drive 6 has an electric motor 7 for realizing the torque assistance by means of a belt drive, not depicted. The belt drive has a drive pinion and a belt disk for transmitting the torque assistance to the toothed rack 5 of the electronic power steering apparatus 1 via a recirculating ball gear or a ball screw drive (not depicted). Moreover, an electronic closed- and/or open-loop controller 8 is provided for actuating or regulating the electric motor 7. The disclosure is provided, in the present case, with a belt drive and a separate recirculating ball gear for transmitting the assistance force to the toothed rack 5, as known from DE 100 52 275 A1, for example, on the basis of an electronic power steering apparatus 1 (EPS Electric Power Steering). For further electric power steering system technologies, not shown, with torque or steering assistance, in particular AFS (Active Front Steering) or Steer by Wire, for example, the same implementations according to the disclosure can be attained.

As is evident from the FIGURE, the electronic closed- and/or open-loop controller 8 actuates the electric motor 7 by means of an actuating signal v and is provided with a rotation speed signal u by the electric motor 7 as input signal.

The electronic power steering apparatus 1 has at least one structure-borne sound sensor or acceleration sensor that is electrically connected or communicatively connected to the electronic closed- and/or open-loop controller 8. Therefore, fault signals or measurement signals w from the acceleration sensor 9 are transmitted to the electronic closed- and/or open-loop controller 8 as acceleration values.

The at least one structure-borne sound sensor or acceleration sensor 9 may be of piezoelectric, microelectromechanical or capacitive design.

The at least one structure-borne sound sensor or acceleration sensor 9 can have a weight of <1 g and/or a pickup range from 20 Hz to 6,000 Hz and/or a measurement range from +/−0.0187 $m/s^2$ to +/−5,000 $m/s^2$. The structure-borne sound sensor or acceleration sensor 9 is arranged in the region of the electronic power steering apparatus 1, or in the region of the steering gear 4. In further exemplary embodiments, not depicted, the structure-borne sound sensor or acceleration sensor 9 may be arranged on a housing of the ball screw drive of the steering gear 4, on the electric servo drive 6, in particular on the electric motor 7 or preferably directly on the electronic closed- and/or open-loop controller 8 or the circuit board/printed circuit board thereof. If the structure-borne sound sensor or acceleration sensor 9 is arranged directly on the electronic closed- and/or open-loop controller 8, the wiring is correspondingly low.

The electronic closed- and/or open-loop controller 8 is set up to perform a method according to the disclosure for condition monitoring of the electronic power steering apparatus 1 or of at least one part, e.g. embodied as an electric motor 7, of the electronic power steering apparatus 1 of a motor vehicle that has the power steering apparatus 1, as a computer program. The method according to the disclosure can also be carried out in a manner distributed over further controllers, not depicted, of the motor vehicle. Furthermore, in further exemplary embodiments, not depicted, there is the possibility of carrying out the method on a superordinate controller or system and actuating the electronic closed- and/or open-loop controller 8 accordingly.

The closed- and/or open-loop controller 8 can have the method according to the disclosure for condition monitoring of the electronic power steering apparatus 1 or of at least the part 7 of the electronic power steering apparatus 1 of the motor vehicle executed on it, wherein during the driving mode of the motor vehicle acceleration measured values are continually captured by the acceleration sensor 9 or the structure-borne sound sensor 9 in a region of the electronic power steering apparatus 1, wherein:

a) the captured acceleration measured values are continually supplied to a damage computation section that sums the acceleration measured values, in particular in modified form, and continually forms therefrom at least one variable characterizing a degree of damage to the electronic power steering apparatus 1 or to the at least one part 7 of the electronic power steering apparatus 1; and/or wherein b) at least one variable characterizing a current steering condition of the electronic power steering apparatus 1 or of the at least one part 7 of the electronic power steering apparatus 1 is continually formed from the captured acceleration measured values.

The at least one variable characterizing the current steering condition of the electronic power steering apparatus 1 or of the at least one part 7 of the electronic power steering apparatus 1 can be formed by an analysis of the captured acceleration measured values in regard to frequencies or orders that occur.

The frequencies and orders that occur can be assigned to the at least one part causing them, e.g. to the electric motor 7, a toothed belt, not depicted, or a bearing, not depicted, of the electronic power steering apparatus 1.

The at least one variable characterizing the degree of damage to the electronic power steering apparatus 1 or to the at least one part 7 of the electronic power steering apparatus 1 and/or the at least one variable characterizing the current steering condition of the electronic power steering apparatus 1 or of the at least one part 7 of the electronic power steering apparatus 1 can be continually compared with the at least one prescribed limit value.

In the event of the at least one prescribed limit value being exceeded by the at least one variable characterizing the degree of damage to the power steering apparatus 1 or to the at least one part 7 of the electronic power steering apparatus 1 and/or by the at least one variable characterizing the current steering condition of the electronic power steering apparatus 1 or of the at least one part 7 of the electronic power steering apparatus 1, one or more of the following measures can be initiated:

a) output of a warning to the driver of the motor vehicle;

b) changeover to an emergency operating condition of the electronic power steering apparatus 1 or of the motor vehicle;

c) deactivation of a mode of operation of the electronic power steering apparatus 1 or of the motor vehicle, in particular of autonomous driving; and d) storage of a fault report in a memory element of a closed- and/or open-loop controller 8 of the electronic power steering apparatus 1 or of the motor vehicle, wherein the fault report comprises in particular a current date, a current time and/or a current speed of travel of the motor vehicle.

LIST OF REFERENCE SYMBOLS

1 Electronic power steering apparatus
2 Steering wheel
3 Steering column
4 Steering gear
5 Toothed rack
6 Electric servo drive
7 Electric motor
8 Electronic closed- and/or open-loop controller
9 Acceleration sensor
u Rotation speed signal
v Actuating signal
w Measurement signal

The invention claimed is:

1. A method for monitoring a condition of an electronic power steering apparatus or of at least one part of the electronic power steering apparatus of a motor vehicle, the method comprising:
continually capturing acceleration measured values in a region of the electronic power steering apparatus during a driving mode of the motor vehicle;
continually providing the captured acceleration measured values to a damage computation section configured as a damage meter that continuously sums the acceleration measured values and continually forms therefrom at least one damage variable characterizing a degree of damage to the electronic power steering apparatus or to the at least one part of the electronic power steering apparatus; and
continually comparing the damage variable with at least one prescribed limit value.

2. The method as claimed in claim 1, further comprising:
continually forming at least one condition variable characterizing a current steering condition of the electronic power steering apparatus or of the at least one part of the electronic power steering apparatus from the captured acceleration measured values.

3. The method as claimed in claim 2, further comprising:
forming the at least one condition variable by an analysis of the captured acceleration measured values using frequencies or orders that occur.

4. The method as claimed in claim 3, further comprising:
assigning the frequencies or orders that occur to the at least one part causing them.

5. The method as claimed in claim 4, further comprising:
assigning the frequencies or orders that occur to an electric motor, a toothed belt or a bearing of the electronic power steering apparatus.

6. The method as claimed in claim 2, further comprising:
continually comparing the at least one condition variable with at least one prescribed limit value.

7. The method as claimed in claim 6, further comprising:
in the event of the at least one prescribed limit value being exceeded by the at least one damage variable and/or by the at least one condition variable, initiating one or more of the following measures:
a) output of a warning to a driver of the motor vehicle;
b) changeover to an emergency operating condition of the electronic power steering apparatus or of the motor vehicle;
c) deactivation of a mode of operation of the electronic power steering apparatus or of the motor vehicle; and
d) storage of a fault report in a memory element of an electronic closed-loop and/or open-loop controller of the electronic power steering apparatus or of the motor vehicle,
wherein the fault report includes at least one of a current date, a current time and a current speed of travel of the motor vehicle.

8. The method as claimed in claim 7, wherein the deactivation is of a mode of operation of the electronic power steering apparatus or of the motor vehicle of autonomous driving.

9. The method as claimed in claim 1, further comprising:
capturing the acceleration measured values using at least one acceleration sensor or structure-borne sound sensor arranged in the region of the electronic power steering apparatus.

10. The method as claimed in claim 7, wherein the at least one acceleration sensor or structure-borne sound sensor is arranged on a circuit board of the electronic closed-loop and/or open-loop controller of the electronic power steering apparatus.

11. The method as claimed in claim 1, wherein a computer program includes program code to perform the method when the program is executed on a microprocessor of a computer, in particular on an electronic closed-loop and/or open-loop controller of a motor vehicle.

12. The method as claimed in claim 1, wherein the damage computation section continuously sums the acceleration measured values in a modified form.

13. An electronic power steering apparatus of a motor vehicle, comprising:
a steering handle configured to prescribe a steering wheel angle as a measure of a desired wheel steering angle for at least one steerable wheel of the motor vehicle;
a steering gear configured to convert the steering wheel angle into the wheel steering angle of the at least one steerable wheel of the motor vehicle;
an electric servo drive;
an electronic closed-loop and/or open-loop controller configured to at least one of regulate and activate the electric servo drive; and
at least one acceleration sensor or structure-borne sound sensor arranged in at least one of a region of the electronic power steering apparatus and on a circuit board of the electronic closed-loop and/or open-loop controller,
wherein the electronic closed-loop and/or open-loop controller is provided with acceleration measured values from the at least one acceleration sensor or the at least one structure-borne sound sensor as input signals, and is configured to monitor a condition of the electronic power steering apparatus or of at least one part of the electronic power steering apparatus of the motor vehicle, the controller configured to:
continually capture acceleration measured values in the region of the electronic power steering apparatus during a driving mode of the motor vehicle;
continually provide the captured acceleration measured values to a damage computation section configured as a damage meter that continuously sums the acceleration measured values and continually forms therefrom at least one damage variable characterizing a degree of damage to the electronic power steering apparatus or to the at least one part of the electronic power steering apparatus; and continually compare the damage variable with at least one prescribed limit value.

14. The electronic power steering apparatus as claimed in claim 13, wherein the at least one acceleration sensor or structure-borne sound sensor is of piezoelectric, microelectromechanical or capacitive construction.

15. The electronic power steering apparatus as claimed in claim 13, wherein the at least one acceleration sensor or structure-borne sound sensor includes at least one of a weight of <1 g, a pickup range from 20 Hz to 6000 Hz, and a measurement range from +/−0.0187 m/s$^2$ to +/−5000 m/s$^2$.

16. The electronic power steering apparatus as claimed in claim 13, wherein the at least one acceleration sensor or structure-borne sound sensor is arranged in a region of the steering gear.

17. The electronic power steering apparatus as claimed in claim 16, wherein the at least one acceleration sensor or structure-borne sound sensor is arranged on a housing of the steering gear, on a ball screw drive of the steering gear, on the electric servo drive, on the electric motor, or on the electronic closed-loop and/or open-loop controller.

18. The electronic power steering apparatus as claimed in claim 13, wherein the electric servo drive includes an electric motor.

19. The electronic power steering apparatus as claimed in claim 13, wherein the damage computation section continuously sums the acceleration measured values in a modified form.

20. A motor vehicle comprising:

an electronic power steering apparatus;

an electronic closed-loop and/or open-loop controller; and at least one acceleration sensor or structure-borne sound sensor present in a region of the electronic power steering apparatus, wherein the electronic closed-loop and/or open-loop controller is provided with acceleration measured values from the at least one acceleration sensor or the at least one structured borne sound sensor as input signals, and is configured to monitor a condition of the electronic power steering apparatus or of at least one part of the electronic power steering apparatus of the motor vehicle, the controller configured to:

continually capture acceleration measured values in the region of the electronic power steering apparatus during a driving mode of the motor vehicle;

continually provide the captured acceleration measured values to a damage computation section configured as a damage meter that continuously sums the acceleration measured values and continually forms therefrom at least one damage variable characterizing a degree of damage to the electronic power steering apparatus or to the at least one part of the electronic power steering apparatus; and continually compare the damage variable with at least one prescribed limit value.

* * * * *

UNITED STATES PATENT AND TRADEMARK OFFICE
CERTIFICATE OF CORRECTION

PATENT NO. : 10,864,938 B2
APPLICATION NO. : 16/062080
DATED : December 15, 2020
INVENTOR(S) : Schaenzel et al.

It is certified that error appears in the above-identified patent and that said Letters Patent is hereby corrected as shown below:

In the Claims

In Claim 10, at Column 8, Line 22: "The method as claimed in claim 7" should read --The method as claimed in claim 9--.

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*